United States Patent
Sakamoto

(10) Patent No.: US 11,546,329 B2
(45) Date of Patent: Jan. 3, 2023

(54) PORTABLE COMMUNICATION TERMINAL CONTROL SYSTEM, PORTABLE COMMUNICATION TERMINAL AND RECORDING MEDIUM

(71) Applicant: CASIO COMPUTER CO., LTD., Tokyo (JP)

(72) Inventor: Kazuya Sakamoto, Kawasaki (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 337 days.

(21) Appl. No.: 16/828,010

(22) Filed: Mar. 24, 2020

(65) Prior Publication Data

US 2020/0314097 A1    Oct. 1, 2020

(30) Foreign Application Priority Data

Mar. 25, 2019   (JP) .............................. JP2019-055922

(51) Int. Cl.
*H04L 9/40* (2022.01)
*H04W 12/08* (2021.01)
(Continued)

(52) U.S. Cl.
CPC ......... *H04L 63/0876* (2013.01); *H04W 12/08* (2013.01); *H04W 12/33* (2021.01); *H04W 12/63* (2021.01)

(58) Field of Classification Search
CPC ........... H04L 63/0876; H04L 63/0853; H04W 12/08; H04W 12/33; H04W 12/63;
(Continued)

(56) References Cited

U.S. PATENT DOCUMENTS 10,560,830 B2 *   2/2020   Fujita .................... H04W 52/02
2012/0054838 A1 *  3/2012   Kim ........................ H04L 63/10
726/4

(Continued)

FOREIGN PATENT DOCUMENTS

JP      2004-102682 A    4/2004
JP      6211574 B2       10/2017

*Primary Examiner* — Khoi V Le
(74) *Attorney, Agent, or Firm* — Fitch, Even, Tabin & Flannery LLP

(57) ABSTRACT

A portable communication terminal control system includes a plurality of first portable communication terminals and a second portable communication terminal. A first processor in the first portable communication terminal performs a first portable communication terminal side determination process which determines whether communication connection is in an established state between a first portable communication terminal and the second portable communication terminal. The first processor performs a transmission control process in which, in response to determination that the communication connection with the other first portable communication terminal is in the established state and that the communication connection with the second portable communication terminal is in the established state, a release signal is transmitted to the second portable communication terminal. The second portable communication terminal includes a second processor which, in response to receiving the release signal, shifts the second portable communication terminal to the released state.

12 Claims, 8 Drawing Sheets

(51) Int. Cl.
*H04W 12/33* (2021.01)
*H04W 12/63* (2021.01)

(58) Field of Classification Search
CPC ....... H04W 4/80; H04W 76/14; H04W 76/30; G06F 21/31
See application file for complete search history.

(56) References Cited

U.S. PATENT DOCUMENTS

| | | | |
|---|---|---|---|
| 2015/0268903 A1* | 9/2015 | Baba | H04W 76/34 358/1.15 |
| 2016/0350523 A1* | 12/2016 | Tanno | G06F 21/629 |
| 2017/0078835 A1* | 3/2017 | Ochi | H04W 76/30 |
| 2019/0077368 A1* | 3/2019 | Hwang | H04W 4/025 |

* cited by examiner

FIG.1
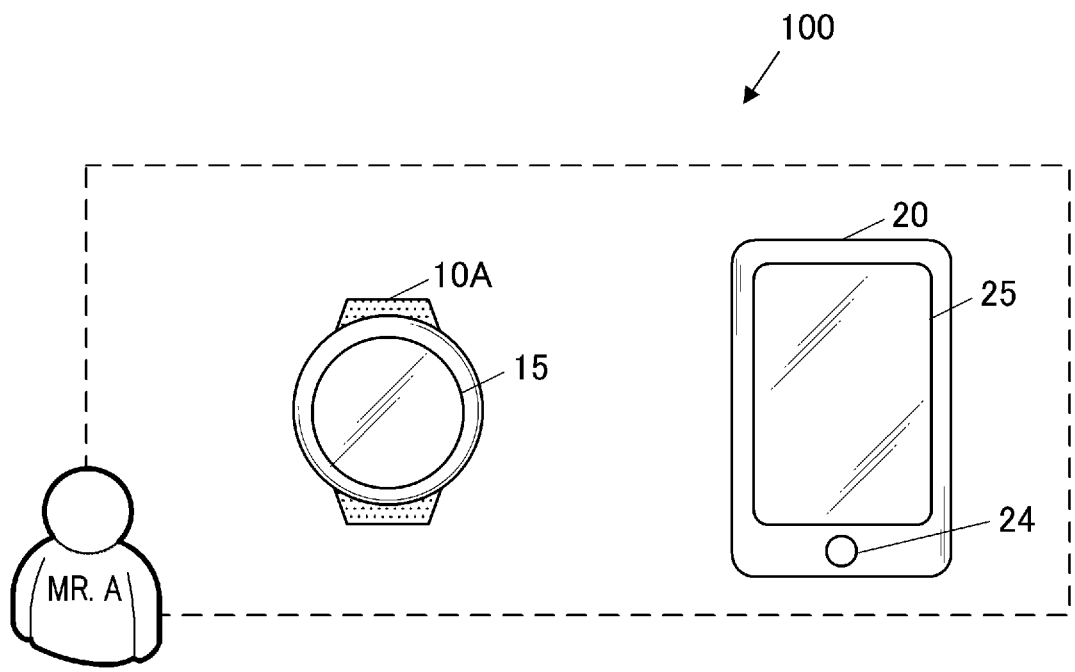
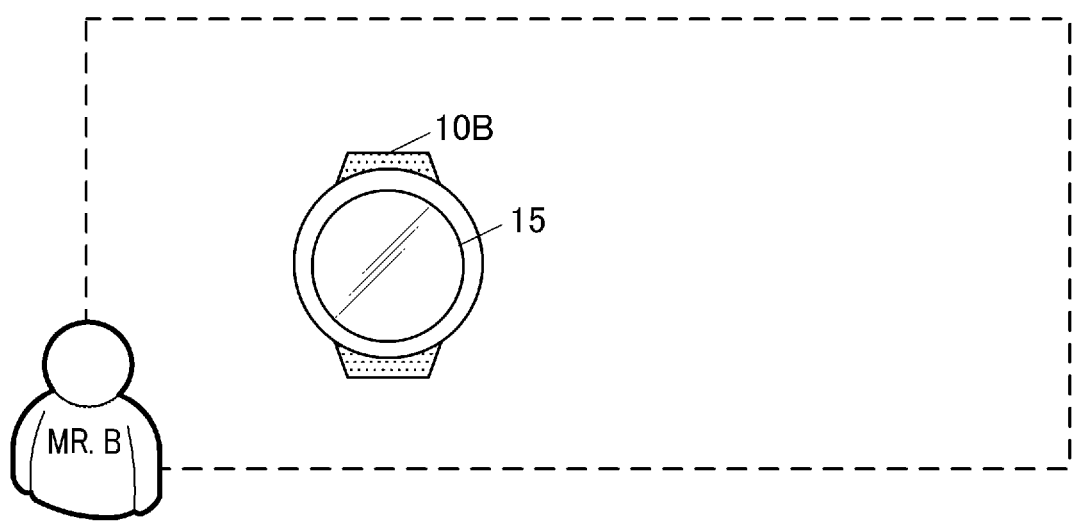

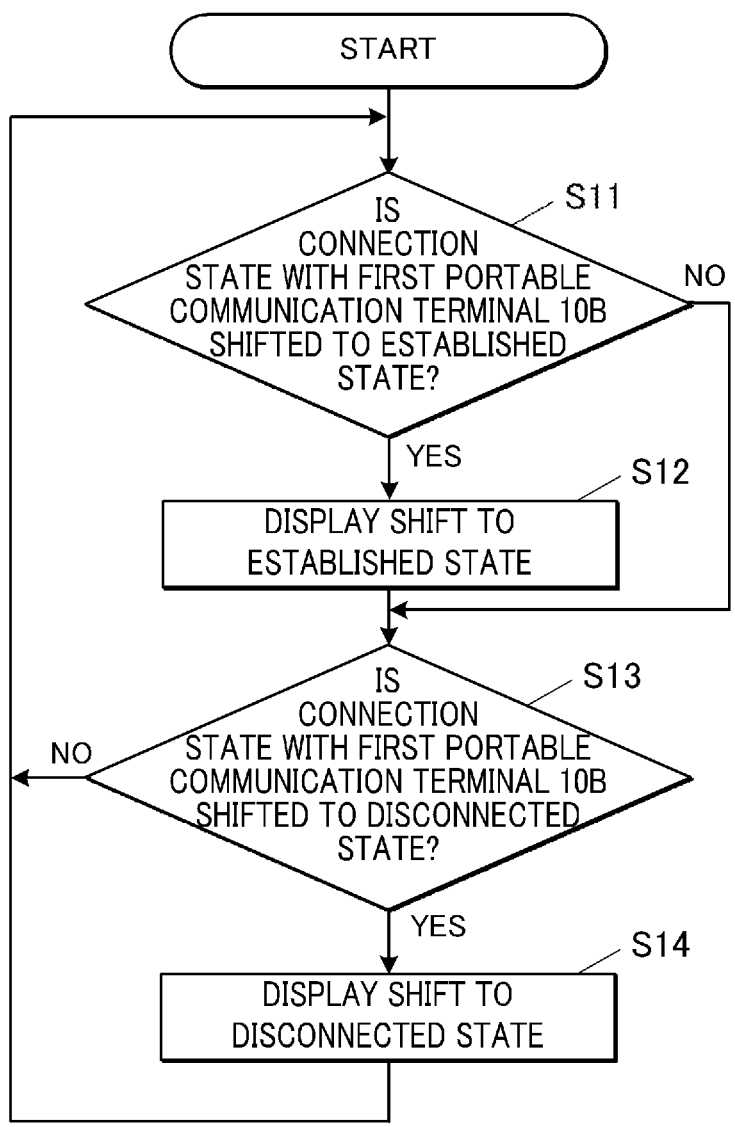

PORTABLE COMMUNICATION TERMINAL CONTROL SYSTEM, PORTABLE COMMUNICATION TERMINAL AND RECORDING MEDIUM

CROSS-REFERENCE TO RELATED APPLICATION

This application is based upon and claims the benefit of priority from the prior Japanese Patent Application No. 2019-055922, filed on Mar. 25, 2019, the entire contents of which are incorporated herein by reference.

BACKGROUND

Technological Field

The present invention relates to a portable communication terminal control system, a portable communication terminal, and a recording medium.

Description of the Related Art

Conventionally, for the purpose of preventing unauthorized use of a terminal device by a third party, for example, a system for unlocking a terminal device only when connection by short-range wireless communication with a portable terminal owned by a user is possible has been disclosed (for example, see Japanese Patent No. 6211574 and Japanese Patent Application Laid-Open Publication No. 2004-102682).

However, in the systems disclosed in Japanese Patent No. 6211574 and Japanese Patent Application Laid-Open Publication No. 2004-102682, when a terminal device is used in a security service or the like in which work (for example, cash transportation) is always performed in a pair of two, if the operator who owns the portable terminal approaches the terminal device alone, the use of the terminal device becomes possible even if the two are not always together, and it is not possible to always perform the work in a pair of two.

SUMMARY

In order to solve the above problems, the portable communication terminal control system according to the present invention includes, a plurality of first portable communication terminals including a specific first portable communication terminal, a second portable communication terminal which shifts between either one of the following states, a limited state in which execution of a predetermined function is limited and a released state in which the limited state is released, wherein, the specific first portable communication terminal includes a first processor configured to execute the following processes, a first portable communication terminal side determination process which determines whether communication connection is in an established state in which short-range wireless communication is established between a first portable communication terminal other than the specific first portable communication terminal and the second portable communication terminal, and a transmission control process in which, in response to determination by the first portable communication terminal side determination process that the communication connection with the other first portable communication terminal is in the established state and that the communication connection with the second portable communication terminal is also in the established state, a release signal to shift the second portable communication terminal to the released state is transmitted to the second portable communication terminal, and the second portable communication terminal includes a second processor which is configured to execute a control process in which, in response to receiving the release signal from the specific first portable communication terminal, the second portable communication terminal is shifted to the released state.

BRIEF DESCRIPTION OF THE DRAWINGS

FIG. 1 is a diagram showing a configuration of a portable communication terminal control system.

FIG. 6 is a flowchart showing a display update process of the first portable communication terminal functioning as the central in the short-range wireless by the BLE.

DETAILED DESCRIPTION OF EMBODIMENTS

Hereinafter, embodiments of the present invention will be described in detail with reference to the accompanying drawings. The present invention is not limited to the illustrated examples.

<Configuration of Portable Communication Terminal Control System 100>

Figure 2:
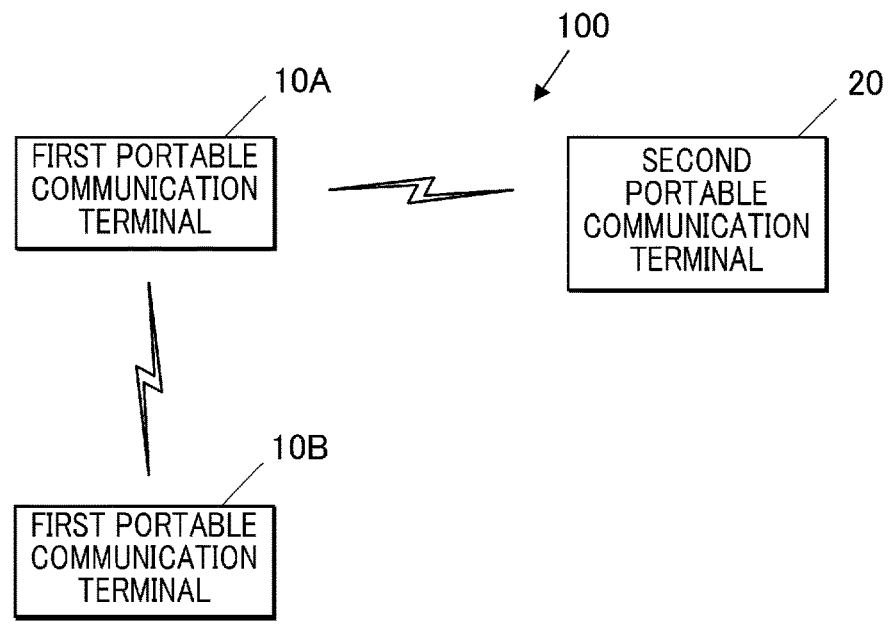
FIG. 2 is a diagram showing a configuration of a portable communication terminal control system.

FIGS. 1 and 2 are diagrams showing a configuration of a portable communication terminal control system 100 of the present embodiment.

As shown in FIGS. 1 and 2, the portable communication terminal control system 100 includes two first portable communication terminals 10A and 10B and a second portable communication terminal 20.

The first portable communication terminals 10A and 10B and the second portable communication terminal 20 perform short-range wireless communication by BLE (Bluetooth (registered trademark) Low Energy). Specifically, one first portable communication terminal 10A (specific first portable communication terminal, portable communication terminal) is used as a central (base) and the other first portable communication terminal 10B and second portable communication terminal 20 are used as a peripheral (slave) for short-distance wireless communication.

The first portable communication terminals 10A and 10B are, for example, smart watches respectively worn by Mr. A and Mr. B who carry out cash transportation or the like in a pair of two in security service. In the portable communication terminal control system 100 of the present embodiment, it is assumed that the first portable communication terminal 10A (first smart watch) is worn by Mr. A (one user), and the first portable communication terminal 10B (second smart watch) is worn by Mr. B.

The second portable communication terminal 20 is a tablet-type terminal such as a handheld terminal or a smartphone, and is a terminal device used when Mr. A and Mr. B perform the work such as transporting money in a pair of two. In the portable communication terminal control system 100 of the present embodiment, it is assumed that the second portable communication terminal 20 is carried by Mr. A. The second portable communication terminal 20 is installed with application programs (application program 1 and application program 2 (to be described later)) used when carrying out works such as cash transport as described above. This application program cannot be executed when Mr. A and Mr. B are not together, that is, when the first portable communication terminal 10A worn by Mr. A and the first portable communication terminal 10B worn by Mr. B do not exist in a range in which short-range wireless communication by BLE can be performed.

<Configuration of the First Portable Communication Terminal>

Next, the first portable communication terminals 10A and 10B will be described with reference to FIG. 3.

Here, except that the first portable communication terminal 10A functions as the central in the short-range wireless communication by BLE, and the first portable communication terminal 10B functions as the peripheral, the configuration and the operation of the first portable communication terminals 10A and 10B are substantially the same, and therefore, the first portable communication terminal 10A will be exemplified as a representative.

Figure 3:
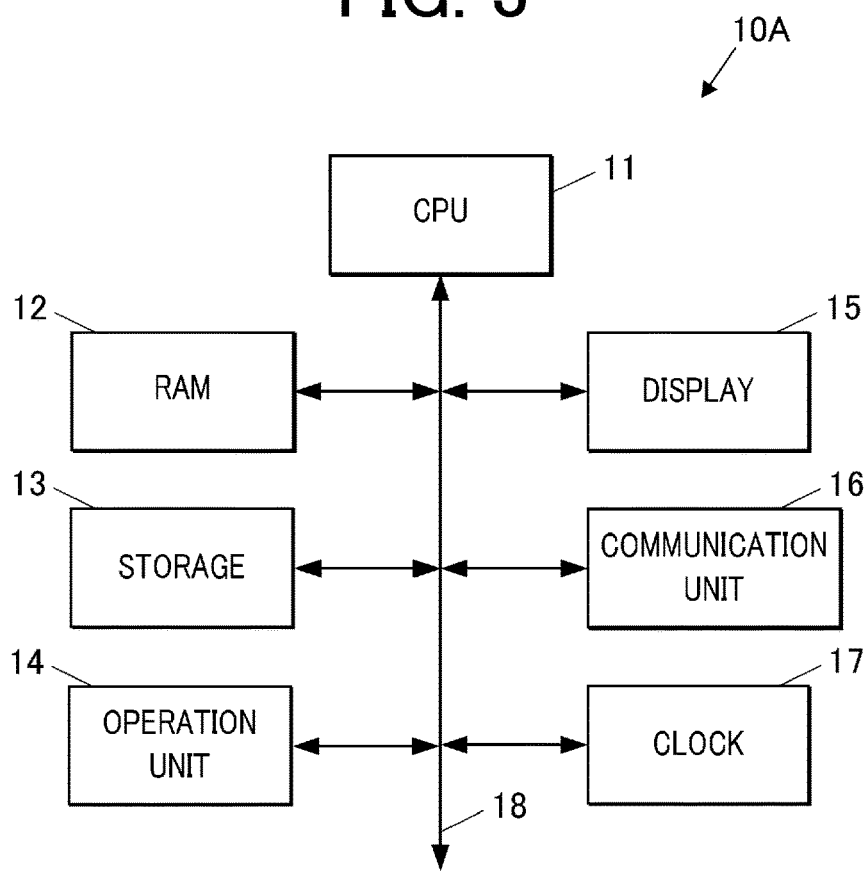
FIG. 3 is a block diagram showing a functional configuration of the first portable communication terminal.

FIG. 3 is a block diagram showing a functional configuration of the first portable communication terminal 10A.

As shown in FIG. 3, the first portable communication terminal 10A includes a central processing unit (Central Processing Unit) 11, a random access memory (Random Access Memory) 12, a storage 13, an operation unit 14, a display 15, a communication unit 16, a clock 17, and the like, and each unit is connected via a bus 18.

The CPU (first portable communication terminal side discrimination means (discrimination means), transmission control means) 11 is a processor for controlling each unit of the first portable communication terminal 10A. The CPU 11 reads out a program stored in the storage 13, deploys the program on a RAM 12, and executes the program to perform various arithmetic processes. The CPU 11 (first processor) executes a first portable communication terminal side discrimination process (discrimination process), a transmission control process, and a display control process.

The RAM 12 provides the CPU 11 with working memory space and stores temporary data. The RAM 12 may include non-volatile memories.

The storage 13 stores programs executed by the CPU 11 and various data such as setting data. The program is stored in the storage 13 in the form of a computer-readable program code. As the storage unit 13, a storage device which does not require a power source to hold data is used, such as an HDD (Hard Disk Drive), an SSD (Solid State Drive), or a flash memory.

The setting data stored in the storage 13 includes identification data for identifying and specifying the first portable communication terminal 10B and the second portable communication terminal 20 as objects with which the communication unit 16 performs the short-range wireless communication by BLE.

The operation unit 14 includes a push-button switch, a touch sensor provided on the display 15, and the like, and receives a user-input operation, converts the operation content into an electric signal, and outputs the electric signal to the CPU 11.

The display 15 includes LCDs or the like, and displays screens in accordance with display control signals from the CPU 11. On the display screen of the display 15, the touch sensor is provided. The display 15 thus functions as a touch panel type operation display.

The communication unit 16 is a communication module including an antenna, a modulation/demodulation circuit, a signal processing circuit, and the like, and performs wireless data communication with the communication unit 16 of the first portable communication terminal 10B and the communication unit 26 of the second portable communication terminal 20 in accordance with a communication standard related to short-range wireless communication by BLE.

The clock 17 is configured to include, for example, a timer, a clock circuit, and the like, and measures the current time to acquire time information.

<Configuration of Second Portable Communication Terminal>

Figure 4:
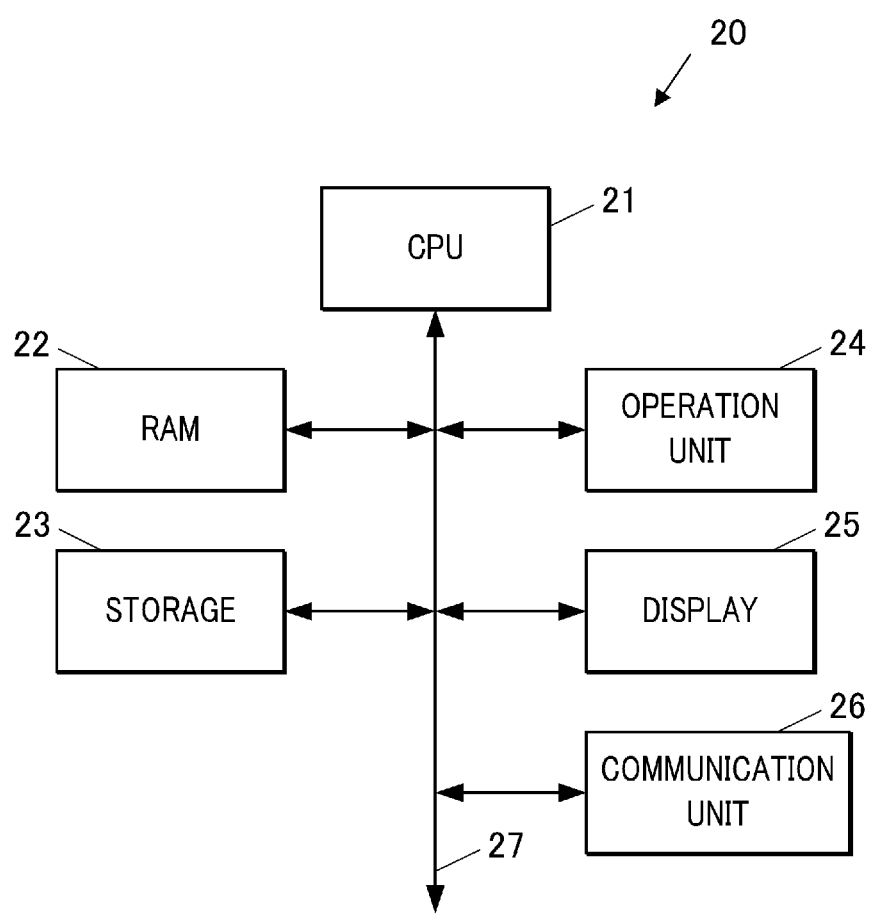
FIG. 4 is a block diagram showing a functional configuration of the second portable communication terminal.

FIG. 4 is a block diagram showing a functional configuration of the second portable communication terminal 20.

As shown in FIG. 4, the second portable communication terminal 20 includes a CPU 21, a RAM 22, a storage 23, an operation unit 24, a display 25, a communication unit 26, and the like, and the respective units are connected via a bus 27.

The CPU (control means, second portable communication terminal side determination means) 21 is a processor for controlling each unit of the second portable communication terminal 20. The CPU 21 reads a program stored in the storage 23, which includes the above-described application program and the like, deploys the program in the RAM 22, and executes the program to perform various arithmetic processes. The CPU 21 (second processor) executes a control process and a second portable communication terminal side discrimination process.

The RAM 22 provides the CPU 21 with working memory space and stores temporary data. The RAM 22 may include non-volatile memories.

The storage 23 stores programs executed by the CPU 21 and various data such as setting data. The program is stored in the storage 23 in the form of a computer-readable program code. As the storage 23, for example, an HDD, an SSD, a flash memory, or the like is used.

The setting data stored in the storage 23 includes identification data for identifying and specifying the first portable communication terminal 10A as an object with which the communication unit 26 performs the short-range wireless communication by using BLE.

The operation unit 24 is configured to include a push-button switch, a touch sensor provided on the display 25, and the like, and receives a user-input operation, converts the operation content into an electric signal, and outputs the electric signal to the CPU 21.

The display 25 includes LCDs, CRTs, and the like, and displays screens in accordance with display control signals from the CPU 21. On the display screen of the display 25, the touch sensor is provided. The display 25 thus functions as a touch panel type operation display.

The communication unit 26 is a communication module including an antenna, a modulation/demodulation circuit, a signal processing circuit, and the like, and performs wireless data communication with the communication unit 16 of the first portable communication terminal 10A in accordance with a communication standard related to short-range wireless communication by BLE.

<Summary of Operation of Portable Communication Terminal Control System>

Next, the operation of the portable communication terminal control system 100 will be described by referring to FIGS. 5 to 9C.

[Status Control Process]

Figure 5:
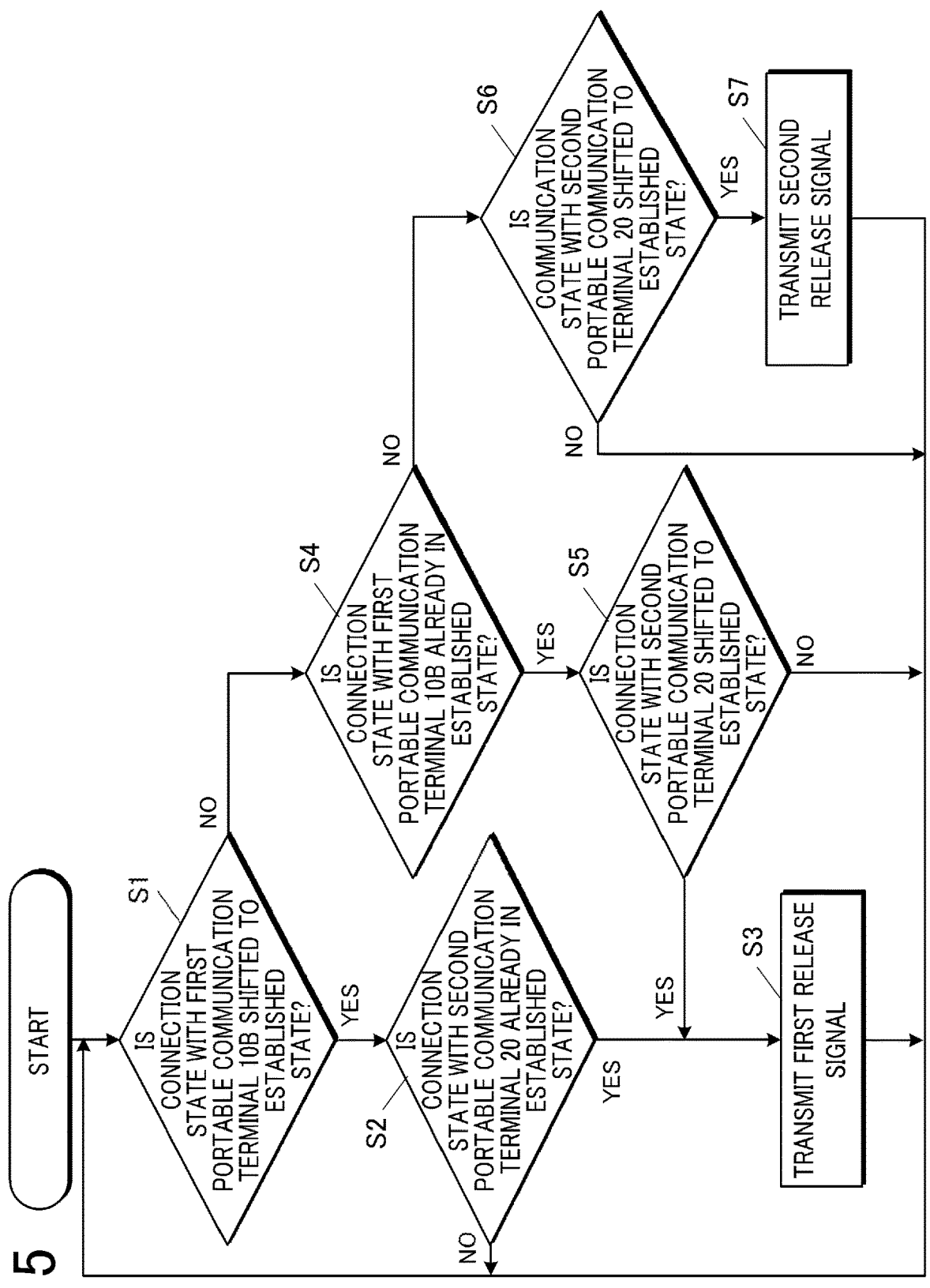
FIG. 5 is a flowchart showing a status control process of a first portable communication terminal functioning as a central in short-range wireless by BLE.

FIG. 5 is a flowchart showing the status control process of the first portable communication terminal 10A which functions as the central in the short-range wireless by BLE.

As shown in FIG. 5, first, the CPU 11 of the first portable communication terminal 10A determines whether or not the communication connection state with the first portable communication terminal 10B in the short-range wireless by the BLE is shifted from the disconnected state to the established state (step S1). That is, in step S1, it is determined whether or not Mr. A and Mr. B have shifted from the separated state to the close state.

In step S1, when it is determined that the communication connection state with the first portable communication terminal 10B has shifted from the disconnected state to the established state (step S1; YES), the CPU 11 of the first portable communication terminal 10A determines whether or not the communication connection state with the second portable communication terminal 20 in the short-range wireless by BLE is already established (step S2).

In step S2, when it is determined that the communication connection state with the second portable communication terminal 20 is already established (step S2; YES), the CPU 11 of the first portable communication terminal 10A transmits a first release signal for releasing the execution restriction of all the application programs of the second portable communication terminal 20 to the second portable communication terminal 20 via the communication unit 16 (step S3). That is, the CPU 11 executes a first portable communication terminal side discrimination process (discrimination process) and a transmit control process. Then, the CPU 11 of the first portable communication terminal 10A returns the process to step S1, and repeats the subsequent processes.

When it is determined in step S2 that the communication connection state with the second portable communication terminal 20 is not the established state, that is, the communication connection state is the disconnected state (step S2; NO), the CPU 11 of the first portable communication terminal 10A returns the process to step S1, and repeats the subsequent processes.

When it is determined in step S1 that the communication connection state with the first portable communication terminal 10B has not shifted from the disconnected state to the established state (step S1; NO), the CPU 11 of the first portable communication terminal 10A determines whether or not the communication connection state with the first portable communication terminal 10B is already established (step S4).

In step S4, when it is determined that the communication connection state with the first portable communication terminal 10B is already established (step S4; YES), the CPU 11 of the first portable communication terminal 10A determines whether or not the communication connection state with the second portable communication terminal 20 has shifted from the disconnected state to the established state (step S5).

When it is determined in step S5 that the communication connection state with the second portable communication terminal 20 has shifted from the disconnected state to the established state (step S5; YES), the CPU 11 of the first portable communication terminal 10A transmits a first release signal to the second portable communication terminal 20 via the communication unit 16 (step S3). Then, the CPU 11 of the first portable communication terminal 10A returns the process to step S1, and repeats the subsequent processes.

When it is determined in step S5 that the communication connection state with the second portable communication terminal 20 has not shifted from the disconnected state to the established state (step S5; NO), the CPU 11 of the first portable communication terminal 10A returns the process to step S1 and repeats the subsequent processes.

When it is determined in step S4 that the communication connection state with the first portable communication terminal 10B is not the established state, that is, the disconnected state (step S4; NO), the CPU 11 of the first portable communication terminal 10A determines whether or not the communication connection state with the second portable communication terminal 20 has shifted from the disconnected state to the established state (step S6).

In step S6, when it is determined that the communication connection state with the second portable communication terminal 20 has shifted from the disconnected state to the established state (step S6; YES), the CPU 11 of the first portable communication terminal 10A transmits a second release signal for releasing the limits on executing some application programs of the second portable communication terminal 20 to the second portable communication terminal 20 via the communication unit 16 (step S7). Then, the CPU 11 of the first portable communication terminal 10A returns the process to step S1, and repeats the subsequent processes.

When it is determined in step S6 that the communication connection state with the second portable communication terminal 20 has not shifted from the disconnected state to the established state (step S6; NO), the CPU 11 of the first portable communication terminal 10A returns the process to step S1 and repeats the subsequent processes.

[Display Update Process]

Figure 7A:
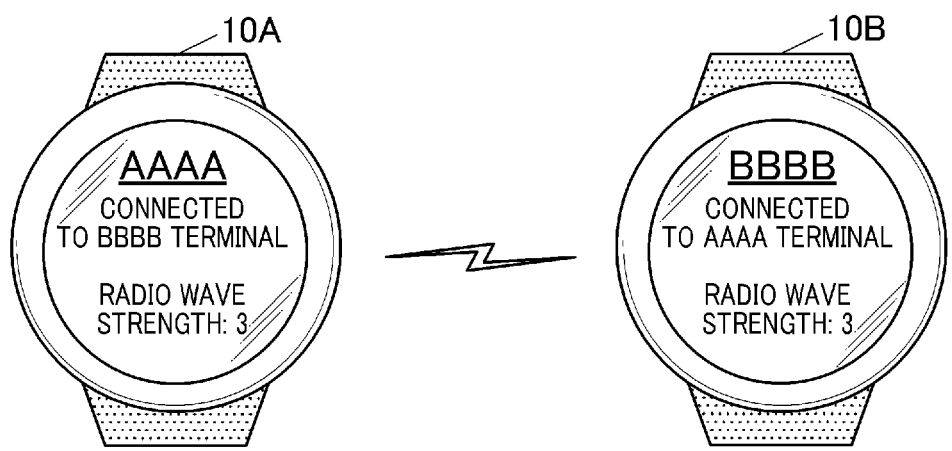
FIG. 7A is a diagram showing an example of a display mode in a display of each terminal when a first portable communication terminal functioning as a central and a first portable communication terminal functioning as a peripheral are shifted to an established state in short-distance wireless by BLE.
Figure 7B:
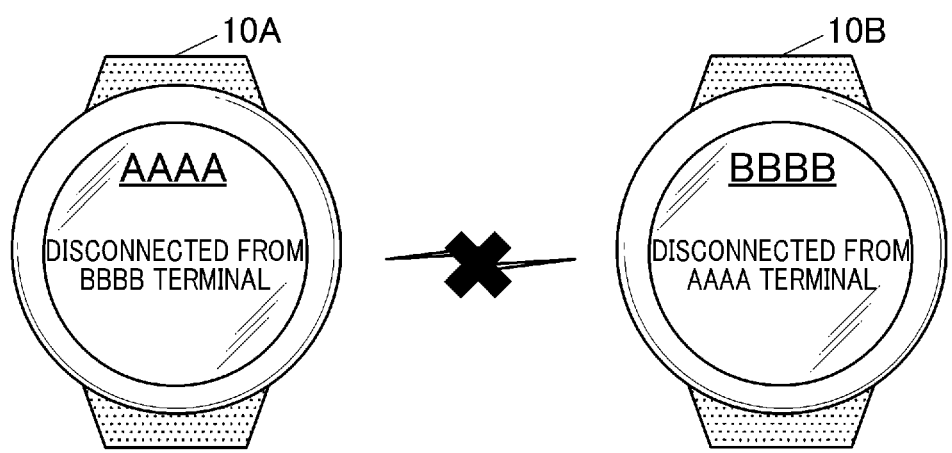
FIG. 7B is a diagram showing an example of a display mode in a display of each terminal when a first portable communication terminal functioning as a central and a first portable communication terminal functioning as a peripheral are shifted to a disconnected state.

FIG. 6 is a flowchart showing the display update process of the first portable communication terminal 10A. FIG. 7A is a diagram showing an example of a display mode on the display 15 of each terminal when the first portable communication terminal 10A and the first portable communication terminal 10B are shifted to the established state, and FIG. 7B is a diagram showing an example of a display mode on the display 15 of each terminal when the first portable communication terminal 10A and the first portable communication terminal 10B are shifted to the disconnected state.

Note that this display update process is also performed in the first portable communication terminal 10B functioning as a peripheral in the short-distance wireless by BLE, and therefore, the display update process of the first portable communication terminal 10A will be described as a representative example.

As shown in FIG. 6, first, the CPU 11 of the first portable communication terminal 10A determines whether or not the communication connection state with the first portable communication terminal 10B in the short-range wireless by the BLE is shifted from the disconnected state to the established state (step S11). That is, in step S11, it is determined whether or not Mr. A and Mr. B have shifted from the separated state to the together state.

In step S11, when it is determined that the communication connection state between the first portable communication terminal 10B has shifted from the disconnected state to the established state (step S11; YES), as shown in FIG. 7A, the CPU 11 of the first portable communication terminal 10A displays on the display 15 of the first portable communication terminal 10A that the state shifted to the established state (e.g., character information of "connected to BBBB terminal") (step S12). That is, the CPU 11 executes the display control process. Further, at this time, in the first portable communication terminal 10B also, the display showing that the shift to the established state (e.g., character information of "connected to AAAA terminal") is made is displayed on the display 15 of the first portable communication terminal 10B. Here, "AAAA" displayed on the display 15 of the terminals is a name for identifying the first portable communication terminal 10A, and "BBBB" is a name (identification information) for identifying the first portable communication terminal 10B. At this time, the CPU 11 of the first portable communication terminal 10A may notify that the first portable communication terminal 10A has shifted to the established state by operating the vibration motors (not shown) included in the first portable communication terminal 10A.

On the other hand, if it is determined in step S11 that the communication connection state with the first portable communication terminal 10B has not shifted from the disconnected state to the established state (step S11; NO), the CPU 11 of the first portable communication terminal 10A skips step S12 and advances the process to step S13.

Next, the CPU 11 of the first portable communication terminal 10A determines whether or not the communication connection state with the first portable communication terminal 10B in the short-range wireless by BLE has shifted from the established state to the disconnected state (step S13). That is, in step S13, a determination is made as to whether or not Mr. A and Mr. B have shifted from a state in which they are together to a state in which they are separated from each other.

In step S13, when it is determined that the communication connection state between the first portable communication terminal 10B has shifted from the established state to the disconnected state (step S13; YES), as shown in FIG. 7B, the CPU 11 of the first portable communication terminal 10A displays on the display 15 of the first portable communication terminal 10A that the process shifted to the disconnected state (e.g., character information of "disconnected from BBBB terminal") (step S14). At this time, also in the first portable communication terminal 10B, a message showing that the state is shifted to the disconnected state (for example, the character information "disconnected from AAAA terminal" is displayed on the display 15 of the first portable communication terminal 10B. Then, the CPU 11 of the first portable communication terminal 10A returns the process to step S11, and repeats the subsequent processes. At this time, the CPU 11 of the first portable communication terminal 10A may notify that the first portable communication terminal 10A has shifted to the disconnected state by operating the vibration motors (not shown) included in the first portable communication terminal 10A.

On the other hand, if it is determined in step S13 that the communication connection state with the first portable communication terminal 10B has not shifted from the established state to the disconnected state (step S13; NO), the CPU 11 of the first portable communication terminal 10A returns the process to step S11 and repeats the subsequent processes.

[State Shift Process]

Figure 8:
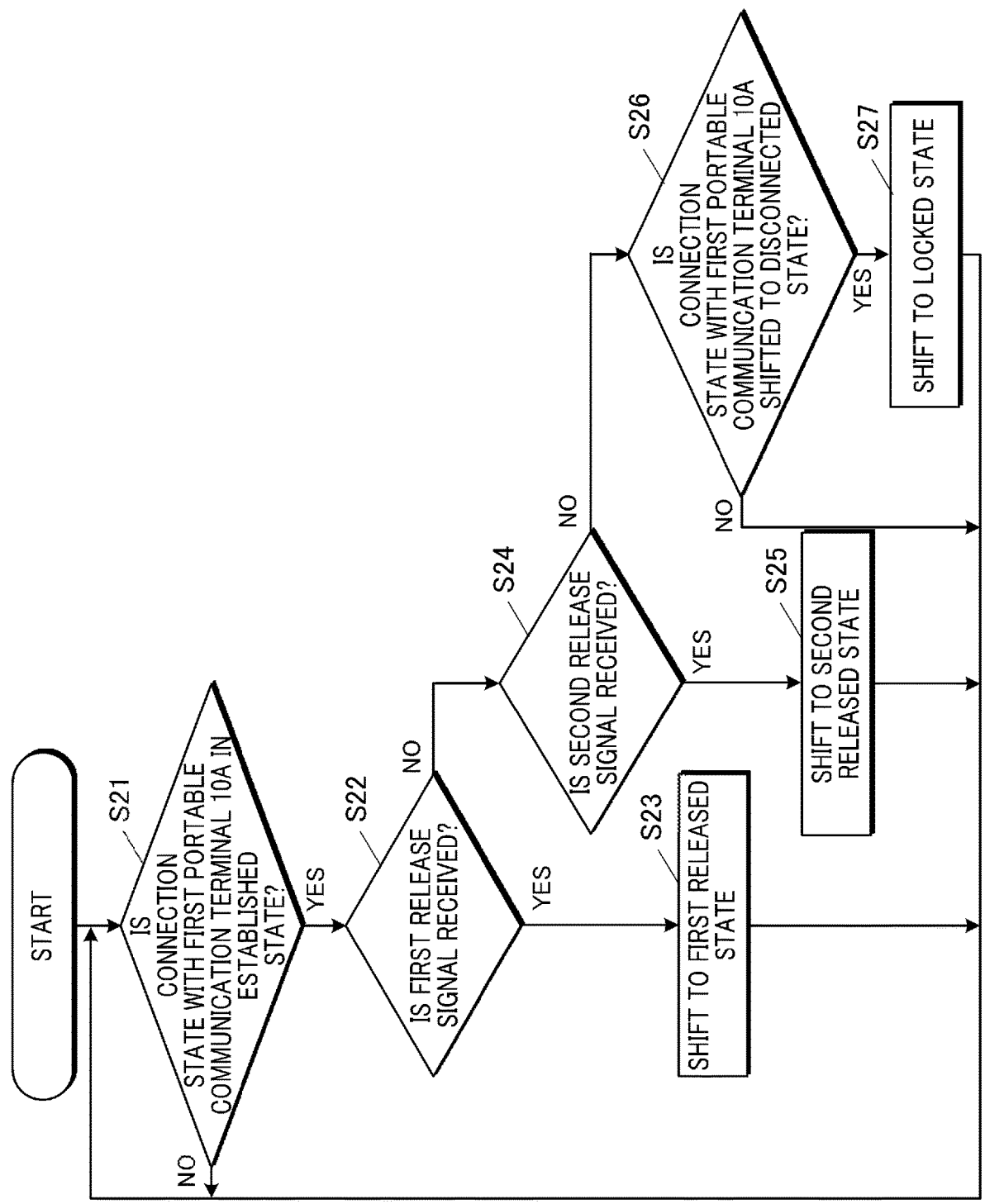
FIG. 8 is a flowchart showing a state shift process of a second portable communication terminal functioning as a peripheral in the short-range wireless by the BLE.
Figure 9A:
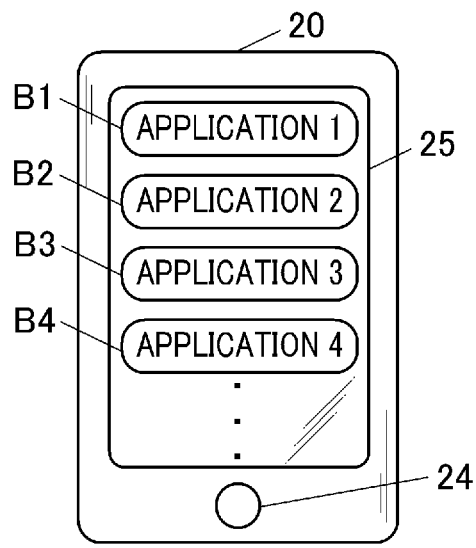
FIG. 9A is a diagram showing an example of a display mode in the display of the second portable communication terminal when the state is shifted to the first released state.
Figure 9B:
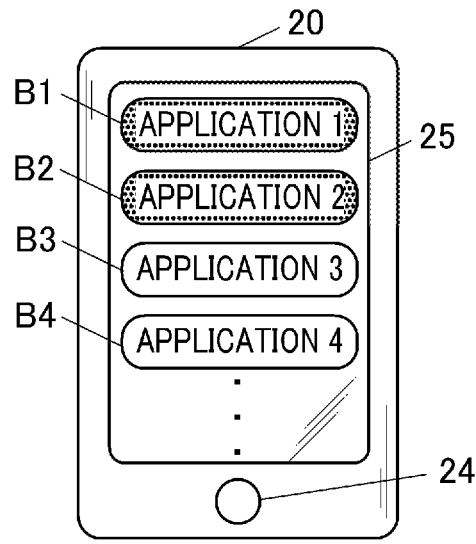
FIG. 9B is a diagram showing an example of a display mode in the display of the second portable communication terminal when the state is shifted to the second released state.
Figure 9C:
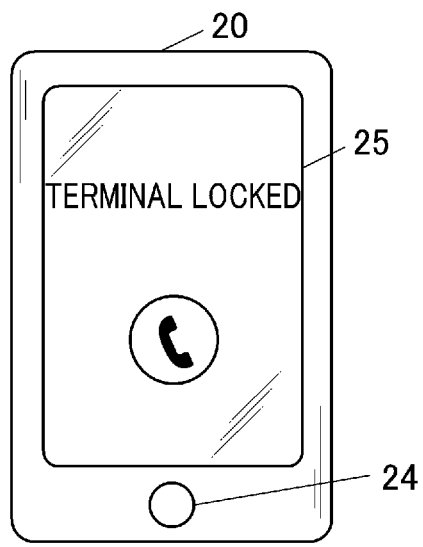
FIG. 9C is a diagram showing an example of a display mode in the display of the second portable communication terminal when the state is shifted to the locked state.

FIG. 8 is a flowchart showing a state shift process of the second portable communication terminal 20 functioning as a peripheral in the short-range wireless by BLE. FIG. 9A is a diagram showing an example of a display mode on the display 25 of the second portable communication terminal 20 when the state shifts to the first released state, FIG. 9B is a diagram showing an example of a display mode on the display 25 of the second portable communication terminal 20 when the state shifts to the second released state, and FIG. 9C is a diagram showing an example of a display mode on the display 25 of the second portable communication terminal 20 when the state shifts to the locked state.

As shown in FIG. 8, first, the CPU 21 of the second portable communication terminal 20 determines whether or not the communication connection state with the first portable communication terminal 10A in the short-range wireless by the BLE is in the established state (step S21).

When it is determined in step S21 that the communication connection state with the first portable communication terminal 10A is the established state (step S21; YES), the CPU 21 of the second portable communication terminal 20 determines whether or not the first release signal has been received from the first portable communication terminal 10A via the communication unit 26 (step S22).

On the other hand, when it is determined in step S21 that the communication connection state with the first portable communication terminal 10A is not in the established state, that is, the communication connection state is in the disconnected state (step S21; NO), the CPU 21 of the second portable communication terminal 20 returns the process to step S21, and repeats the subsequent processes.

When it is determined in step S22 that the first release signal has been received from the first portable communication terminal 10A (step S22; YES), the CPU 21 of the second portable communication terminal 20 shifts the terminal to the first released state in which the limits on the execution of all of the application programs of the terminal have been released (step S23). As shown in FIG. 9A, when the state is shifted to the first released state, the display 25 of the second portable communication terminal 20 displays in an operable state the activation buttons B1, B2, B3, B4, . . . for starting each application program. Here, among these application programs, the application program (application) 1 and the application program (application) 2 are programs that handle highly confidential information (e.g., financial information, personal information, etc.), and are programs that are required to be executed in a state where Mr. A and Mr. B are together (security is required). In the first released state, the application program 1 and the application program 2 can be executed.

Then, the CPU 21 of the second portable communication terminal 20 returns the process to S21, and repeats the subsequent processes.

When it is determined in step S22 that the first release signal has not been received from the first portable communication terminal 10A (step S22; NO), the CPU of the second portable communication terminal 20 determines whether or not the second release signal has been received from the first portable communication terminal 10A via the communication unit 26 (step S24).

When it is determined in step S24 that the second release signal has been received from the first portable communication terminal 10A (step S24; YES), the CPU 21 of the second portable communication terminal 20 shifts the state of the terminal to the second released state (step S25). That is, the CPU 21 executes the control process and the second portable communication terminal side determination process. As shown in FIG. 9B, when the state shifts to the second released state, in the display 25 of the second portable communication terminal 20, the start buttons B1 and B2 for starting the application program 1 and the application program 2 among the application programs are displayed in a state that can not be operated. That is, in the second released state, it is possible to execute only application programs other than the application program 1 and the application program 2, that is, only programs that are not required to be executed in a state in which Mr. A and Mr. B are together.

Then, the CPU 21 of the second portable communication terminal 20 returns the process to step S21, and repeats the subsequent processes.

When it is determined in step S24 that the second release signal has not been received from the first portable communication terminal 10A (step S24; NO), the CPU of the second portable communication terminal 20 determines whether or not the communication connection state with the first portable communication terminal 10A has shifted from the established state to the disconnected state (step S26).

In step S26, when it is determined that the communication connection state with the first portable communication terminal 10A has shifted from the established state to the disconnected state (step S26; YES), the CPU 21 of the second portable communication terminal 20 shifts the state of the terminal to a locked state (step S27). As shown in FIG. 9C, when the process shifts to the locked state, the display 25 of the second portable communication terminal 20 displays information indicating that the state is the locked state (e.g., character information of "terminal locked"), and the terminal is in a state in which it is impossible to perform an operation to start each application program. In the locked state, only reception of incoming calls and calling to specific contacts are allowed.

Then, the CPU 21 of the second portable communication terminal 20 returns the process to S21, and repeats the subsequent processes.

When it is determined in step S26 that the communication connection state with the first portable communication terminal 10A has not shifted from the established state to the disconnected state (step S26; NO), the CPU 21 of the second portable communication terminal 20 returns the process to step S21, and repeats the subsequent processes.

As described above, the portable communication terminal control system 100 of the present embodiment includes, a plurality of first portable communication terminals 10A and 10B including a specific first portable communication terminal 10A, and a second portable communication terminal 20 which is shifted to either a limited state in which there is limitation in executing the application program (predetermined function) or a released state in which the limited state is released, the specific first portable communication terminal 10A determines whether the communication connection by short range wireless communication between each of the other first portable communication terminal 10B and the second portable communication terminal 20 is in the established state, and when it is determined that the communication connection with the other first portable communication terminal 10B is in the established state and that the communication connection with the second portable communication terminal 20 is also in the established state, the release signal for shifting the second portable communication terminal 20 to the released state is transmitted to the second portable communication terminal 20, and when the second portable communication terminal 20 receives the release signal from the specific first portable communication terminal 10A, the second portable communication terminal 20 is shifted from the limited state to the released state.

According to such a configuration, only when Mr. A wearing the first portable communication terminal 10A and Mr. B wearing the first portable communication terminal 10B are together with each other as a pair of two people, the application program of the second portable communication terminal 20 (the application program 1 and the application program 2) can be executed. Consequently, it is possible to reliably perform the work performed by two people, Mr. A and Mr. B, as a pair.

In addition, when it is determined that the communication connection with the other first portable communication terminal 10B is in the established state and the communication connection with the second portable communication terminal 20 is also in the established state, the first portable communication terminal 10A transmits a first release signal for shifting the second portable communication terminal 20 to the first released state to the second portable communication terminal 20, and when it is determined that the communication connection with the other first portable communication terminal 10B is not in the established state and that the communication connection with the second portable communication terminal 20 is in the established state, transmits a second release signal for shifting the second portable communication terminal 20 to the second released state to the second portable communication terminal 20, and when the second portable communication terminal 20 receives the first release signal from the first portable communication terminal 10A, the second portable communication terminal 20 shifts the second portable communication terminal 20 to the first released state, and when the second portable communication terminal receives the second release signal from the first portable communication terminal 10A, the second portable communication terminal 20 shifts the second portable communication terminal 20 to the second released state.

According to such a configuration, even when Mr. A wearing the first portable communication terminal 10A and Mr. B wearing the first portable communication terminal 10B are not together, when the communication connection between the first portable communication terminal 10A and the second portable communication terminal 20 is in an established state, it is possible to execute application programs other than the application program 1 and the application program 2, that is, a program which is not required to be executed in a state in which Mr. A and Mr. B are together can be executed, so that workability in the system can be enhanced.

The second portable communication terminal 20 determines whether or not the communication connection with the first portable communication terminal 10A is in the established state, and when it is determined that the communication connection with the first portable communication terminal 10A is not in the established state, shifts the second portable communication terminal 20 from the released state to the limited state.

This makes it possible to prevent the application program of the second portable communication terminal 20 from being executed when Mr. A wearing the first portable communication terminal 10A leaves the place where the second portable communication terminal 20 is located and the communication connection between the first portable communication terminal 10A and the second portable communication terminal 20 is disconnected.

Therefore, since it becomes possible to prevent Mr. B from executing the application program of the second portable communication terminal 20 alone and to prevent a third party from executing the application program, it is possible to secure that the work is performed by a pair of two people, Mr. A and Mr. B.

The description in the above embodiment is an example of the portable communication terminal control system according to the present invention, and is not limited thereto.

For example, in the above embodiment, the second portable communication terminal 20 has been described as being carried by Mr. A, but may be carried by Mr. B.

Further, in the above embodiment, although the description has been made on the assumption that Mr. A and Mr. B carry out the work such as the cash transport as a pair of two people, the number of members may be three or more when the work is carried out by a certain group. In this case, each member carries the first portable communication terminal. Specifically, one of these members carries a first portable communication terminal functioning as a central in the short-range wireless communication by BLE, and members other than the above member carries a first portable communication terminal functioning as a peripheral. In such case, the second portable communication terminal may be carried by any of the above-mentioned members.

In the above embodiment, the condition that the first portable communication terminal 10A transmits the release signal to the second portable communication terminal 20 is that the communication connection state between the first portable communication terminal 10A and the first portable communication terminal 10B is in the established state and the communication connection state between the first portable communication terminal 10A and the second portable communication terminal 20 is also in the established state. Alternatively, for example, the condition that the communication connection state between a third portable communication terminal such as a smartphone or the like carried by Mr. B and the first portable communication terminal 10A are in the established state may be added to the above condition.

In the above embodiment, the execution of the application program stored in the storage 23 of the second portable communication terminal 20 is limited, but the use of the second portable communication terminal 20 itself may be limited.

Although the embodiments of the present invention have been described above, the scope of the present invention is not limited to the above-described embodiments, and includes the scope of the claimed invention equivalent thereto.

What is claimed is:

1. A portable communication device control system comprising:
   a plurality of first portable communication devices including a specific first portable communication device,
   a second portable communication device which shifts between either one of the following states, a limited state in which execution of a predetermined function is limited and a released state in which the limited state is released,
   wherein the specific first portable communication device includes,
      a first communicator that performs communication with another first portable communication device other than the specific first portable communication device and the second portable communication device, and
      a first processor configured to execute the following processes,
         a first portable communication device side determination process which determines whether communication connection is in an established state in which short-range wireless communication is established between the other first portable communication device and the second portable communication device, and
         a transmission control process in which, in response to determination by the first portable communication device side determination process that the communication connection with the other first portable communication device is in the established state and that the communication connection with the second portable communication device is also in the established state, a release signal to shift the second portable communication device to the released state is transmitted to the second portable communication device,
   wherein the second portable communication terminal device includes,
      a second communicator that performs communication with the specific first portable communication device and the other first portable communication device, and
      a second processor which is configured to execute a control process in which, in response to receiving the release signal from the specific first portable communication device, the second portable communication device is shifted to the released state,
   wherein the released state includes a first released state in which a limit on execution of all of the predetermined functions is released and a second released state in which a limit on the execution of the predetermined functions is released for some of the functions,
   wherein in the transmission control process, in response to determination by the first portable communication device side determination process that the communication connection with the other first portable communication device is in the established state and that the communication connection with the second portable communication device is also in the established state, the first processor transmits a first release signal to the second portable communication device to shift the second portable communication device to the first released state,
   wherein in the transmission control process, in response to determination by the first portable communication device side determination process that the communication connection with the other first portable communication device is not in the established state and that the communication connection with the second portable communication device is in the established state, the first processor transmits to the second portable communication device a second release signal to shift the second portable communication device to the second released state, wherein in the control process, in response to receiving the first release signal from the specific first portable communication device, the second processor shifts the second portable communication device to the first released state, and wherein in the control process, in response to receiving the second release signal from the specific first portable communication device, the second processor shifts the second portable communication device to the second released state.

2. The portable communication device control system according to claim 1, wherein, the first portable communication device is a smart watch, and the second portable communication device is a tablet type device.

3. The portable communication device control system according to claim 1, wherein, the specific first portable communication device is a first smart watch as a base worn and used by one user, the other first portable communication device is a second smart watch as a slave worn and used by another user who performs predetermined work together with the one user, and the second portable communication device is a tablet type device used when the one user and the other user perform the work.

4. The portable communication terminal control system according to claim 1, wherein the predetermined function is an application program used in the predetermined work performed in a state in which a plurality of users wearing the first portable communication device are together.

5. The portable communication device control system according to claim 1, wherein the first processor executes a display control process to display on a display identification information of the other first portable communication device determined by the first portable communication device side determination process that the communication connection is in the established state.

6. A portable communication device control system comprising:

a plurality of first portable communication devices including a specific first portable communication device, a second portable communication device which shifts between either one of the following states, a limited state in which execution of a predetermined function is limited and a released state in which the limited state is released, wherein the specific first portable communication device includes, a first communicator that performs communication with another first portable communication device other than the specific first portable communication device and the second portable communication device, and a first processor configured to execute the following processes, a first portable communication device side determination process which determines whether communication connection is in an established state in which short-range wireless communication is established between the other first portable communication device and the second portable communication device, and a transmission control process in which, in response to determination by the first portable communication device side determination process that the communication connection with the other first portable communication device is in the established state and that the communication connection with the second portable communication device is also in the established state, a release signal to shift the second portable communication terminal device to the released state is transmitted to the second portable communication device, wherein the second portable communication device includes, a second communicator that performs communication with the specific first portable communication device and the other first portable communication device, and a second processor which is configured to execute a control process in which, in response to receiving the release signal from the specific first portable communication device, the second portable communication device is shifted to the released state, wherein the second processor executes a second portable communication device side determination process to determine whether the communication connection with the specific first portable communication device is in an established state, and wherein in the control process, in response to determination by the second portable communication device side determination process that the communication connection with the specific first portable communication device is not in the established state, the second processor shifts the second portable communication device from the released state to the limited state.

7. A portable communication device comprising:

a communicator that performs communication with one or two or more first portable communication devices, and a second portable communication device which shifts between either one of the following states, a limited state in which execution of a predetermined function is limited and a released state in which the limited state is released, and a processor, wherein the processor is configured to perform, a determination process which determines whether communication connection is in an established state in which short-range wireless communication is established with the first portable communication devices and whether communication connection is in the established state with the second portable communication device, and a transmission control process in which, in response to determination by the determination process that the communication connection with the first portable communication device is in the established state and that the communication connection with the second portable communication device is also in the established state, a release signal to shift the second portable communication device to the released state is transmitted to the second portable communication device, wherein the released state includes a first released state in which a limit on execution of all of the predetermined functions is released and a second released state in which a limit on the execution of the predetermined functions is released for some of the functions, wherein in the transmission control process, in response to determination by the determination process that the communication connection with the first portable communication device is in the established state and that the communication connection with the second portable communication device is also in the established state, the processor transmits a first release signal to the second portable communication device to shift the second portable communication device to the first released state, and wherein in the transmission control process, in response to determination by the determination process that the communication connection with the first portable communication device is not in the established state and that the communication connection with the second portable communication device is in the established state, the processor transmits to the second portable communication device a second release signal to shift the second portable communication device to the second released state.

8. The portable communication device according to claim 7, wherein,
the portable communication device and the first portable communication device are smart watches, and
the second portable communication device is a tablet type device.

9. The portable communication device according to claim 8, wherein,
the portable communication device is a first smart watch as a base worn and used by one user,
the first portable communication device is a second smart watch as a slave worn and used by another user who performs predetermined work together with the one user, and
the second portable communication device is a tablet type device used when the one user and the other user perform the work.

10. The portable communication device according to claim 7, wherein the predetermined function is an application program used in the predetermined work performed in a state in which the one user wearing the portable communication device and the other user wearing the first portable communication device are together.

11. The portable communication device according to claim 7, wherein the processor executes a display control process to display on a display identification information of the first portable communication device determined by the determination process that the communication connection is in the established state.

12. A non-transitory computer-readable recording medium including a program to be executed by a processor of a portable communication device, wherein the program controls the processor to execute the following processes:

a determination process which determines whether communication connection is in an established state in which short-range wireless communication is established with one or two or more first portable communication devices and whether communication connection is in the established state with a second portable communication device which shifts between either one of the following states, a limited state in which execution of a predetermined function is limited and a released state in which the limited state is released, and a transmission control process in which, in response to determination by the determination process that the communication connection with the first portable communication device is in the established state and that the communication connection with the second portable communication device is also in the established state, a release signal to shift the second portable communication device to the released state is transmitted to the second portable communication device, wherein the released state includes a first released state in which a limit on execution of all of the predetermined functions is released and a second released state in which a limit on the execution of the predetermined functions is released for some of the functions, wherein in the transmission control process, in response to determination by the determination process that the communication connection with the first portable communication device is in the established state and that the communication connection with the second portable communication device is also in the established state, a first release signal is transmitted to the second portable communication device to shift the second portable communication device to the first released state, and wherein in the transmission control process, in response to determination by the determination process that the communication connection with the first portable communication device is not in the established state and that the communication connection with the second portable communication device is in the established state, a second release signal to shift the second portable communication device to the second released state is transmitted to the second portable communication device.

* * * * *